United States Patent [19]

Mezera et al.

[11] Patent Number: 4,730,304
[45] Date of Patent: Mar. 8, 1988

[54] DATA BASE CREATION IN STORED PROGRAM CONTROLLED SWITCHING SYSTEMS

[75] Inventors: Susan A. Mezera, Naperville; Merle K. Pieper, Wheaton, both of Ill.

[73] Assignee: American Telephone and Telegraph Company, AT&T Bell Laboratories, Murray Hill, N.J.

[21] Appl. No.: 783,126

[22] Filed: Oct. 2, 1985

[51] Int. Cl.$^4$ .............................................. H04Q 11/04
[52] U.S. Cl. ........................................ 370/58; 379/279
[58] Field of Search ....................... 370/58, 110.1, 53; 179/18 ES; 379/279; 340/825; 178/3

[56] References Cited

U.S. PATENT DOCUMENTS

| | | | |
|---|---|---|---|
| 4,280,217 | 7/1981 | Hafer | 179/18 ES |
| 4,466,098 | 8/1984 | Southard | 379/279 |
| 4,520,477 | 5/1985 | Wen | 370/58 |
| 4,556,971 | 12/1985 | Thyni | 370/58 |
| 4,654,784 | 3/1987 | Campanini | 379/279 |

*Primary Examiner*—Douglas W. Olms
*Attorney, Agent, or Firm*—Kenneth H. Samples

[57] ABSTRACT

A time division switching system for providing telecommunications connections as defined by information stored in a plurality of control memories is disclosed. The switching system includes arrangements for transferring a new control program from a central control to a time-slot interchange unit controller associated with a time-slot interchange unit and connected line and trunk units. To generate a data base representing complete calls through the line and trunk units and the time-slot interchange unit, the time-slot interchange unit controller reads the information stored in the control memories, identifies complete telecommunications connections, and stores information defining such complete connections in a data base in a format usable by the new control program.

9 Claims, 3 Drawing Figures

DATA BASE CREATION IN STORED PROGRAM CONTROLLED SWITCHING SYSTEMS

TECHNICAL FIELD

This invention relates to program-controlled switching apparatus, and more particularly to arrangements for creating data bases in such apparatus.

BACKGROUND OF THE INVENTION

Many of the telephone switching systems in service today operate in response to a stored program to provide telecommunication services to connected subscribers. This stored program contains data structures of fixed configuration and assigns memory in accordance with fixed principles. Some portion of the data describes the connections presently being made through the switching system. This latter data portion is dynamic in nature and is structured for ease of access and use by the stored program. From time to time, it is desirable to change substantially the controlling program so that new features and services can be provided. To provide the best possible service, stable connections through the switching system should not be disconnected when the program is changed. Thus, to convert from an old controlling program to a new controlling program, the new program must include a data base which defines the current connections being made through the switching system. The new program, however, may not be compatible with the old one. For example, it may be desirable to change the format of data structures to provide new information relating to a new service, or to delete information which is not needed by the new program. Accordingly, the new program cannot just copy the old data structures and be able to provide the telecommunication switching services.

One solution to this problem has been to generate special mapping programs which convert the old data structures and data layout to the form used by the new program. Although such mapping programs achieve the desired result, the construction of such programs is a large undertaking and provides many opportunities for error. Further, the mapping procedures of the new program must conform to the particular old program version being updated. Thus, many different mapping procedures have to be provided.

The present invention is a method and arrangement which allows the conversion from an old controlling program to a new controlling program while saving stable connections, but avoiding the problems of special data mapping procedures.

SUMMARY OF THE INVENTION

The present invention comprises a method for use in an arrangement comprising a switching network, a first controller for establishing and maintaining connections through the network and a second controller. The method comprises reading hardware controlling data from the switching network, generating a data structure from the data so read, storing the data structure in the second controller and establishing and maintaining connections through the network by the second controller operating in accordance with the stored data structure. Data structure generation in accordance with the present invention avoids the above-mentioned problems inherent in prior data base mapping procedures.

One embodiment of the present invention includes time division switching stages each comprising control memories which store hardware controlling data to be used to relatively directly control connections through the switching stages. Also included, is a first controller which comprises a data base describing the switch hardware and the current use and status of that hardware. When control of the switching network is transferred to a second controller, the first controller is inhibited from controlling the network. The second controller reads the hardware controlling data directly from the control memories of the switching network and using this data generates a data structure which represents the switching hardware and its use, in a form acceptable to the second controller. After the data base is created in the second processor, normal call processing is resumed under the control of the second controller without the loss of completed calls through the network.

BRIEF DESCRIPTION OF THE DRAWING

A more complete understanding of the present invention may be obtained from a consideration of the following description when read in conjunction with the drawing in which.

GENERAL DESCRIPTION

Figure 1:
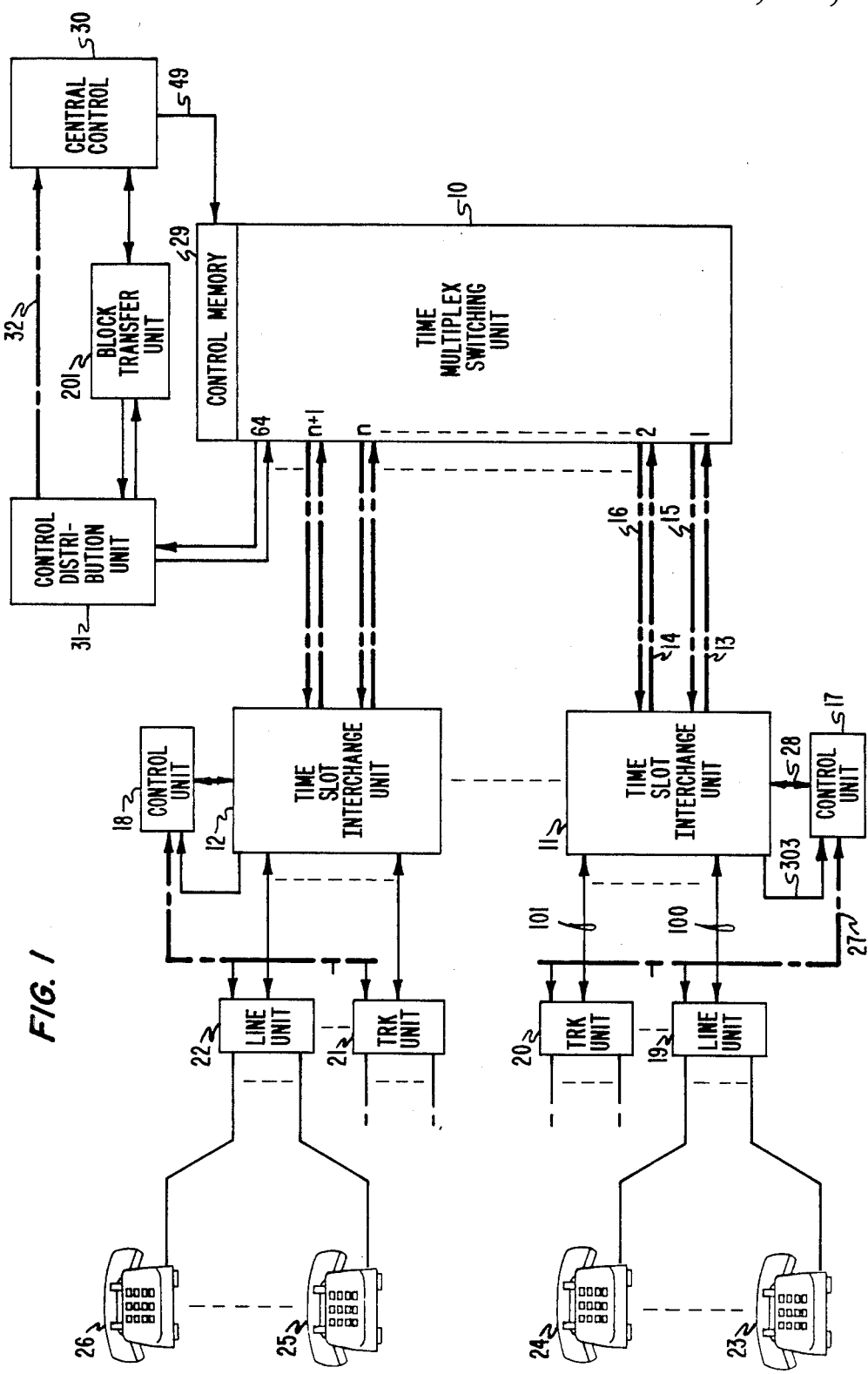
FIG. 1 is a block diagram of a time-division switching system.

FIG. 1 is a block diagram of a time division switching system embodying the present invention. The embodiment of FIG. 1 includes a time multiplex switching unit 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time multiplex switch unit 10. In the present embodiment, time-slot interchange unit 11 is connected to two time multiplex switch input ports via time multiplex lines 13 and 14 and to two output ports, via time multiplex lines 15 and 16. As will be described in greater detail later herein, many of the units of the present embodiment are duplicated for reliability.

In the description which follows, the input and output ports of time multiplex switching unit 10 are referred to as input/output port pairs. This term is used since the source for data words to an input port of a given input/output port pair is also the destination for data words from the output port of that pair. As shown in FIG. 1, input/output port pair 1 is associated with time multiplex lines 13 and 15. Each time multiplex line 13 through 16 conveys digital information in 125 microsecond frames each comprising 256 time separated channels. Accordingly, each time-slot interchange unit transmits and receives up to 512 channels of digital information during each 125 microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line and trunk units via individual time multiplex lines. In the present embodiment line unit 19 and trunk unit 20 are connected to time-slot interchange unit 11 by time multiplex lines 100 and 101, respectively, and trunk unit 21 and line unit 22 are connected to time-slot interchange unit 12. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time multiplex line, channels used to transmit the resulting code between the line unit and its associated time-slot interchange unit are determined by the control unit of the associated time-slot interchange unit. Trunk units, e.g., 20, also cooperate with the control units associated therewith, e.g., 17, to complete telecommunication connections. When signaling information is to be sent on a given trunk, a control unit, e.g., 17, transmits representations of those signals and the identity of the given trunk to the trunk unit, 20, which responds by sending the appropriate signals. When signals are received by trunk unit 20 on a given trunk, the given trunk identity and a signal representing the received signals are transmitted to control unit 17 to initiate the process of telecommunication path setup. Unlike the line unit situation, however, no communication channel on time multiplex line 101 between trunk unit 20 and time-slot interchange unit 11 needs to be selected since each trunk is permanently dedicated to a particular such channel.

Time multiplex switching unit 10 operates in recurring frames of time slots where each 125 microsecond frame comprises 256 time slots. During each time slot, time multiplex switching unit 10 is capable of connecting data words received at any of its 64 input ports to any of its 64 output ports in accordance with time-slot control information stored in a control memory 29. The pattern of connections through time multiplex switching unit 10 repeats itself every 256 time slots and each time slot is assigned a numerical designation in sequence from 1 to 256. Time-slot control information is written into control memory 29 by the central control 30 which derives this control information from control messages obtained from various control units, e.g., 17 and 18.

Central control 30 and the control units 17 and 18 exchange control messages utilizing selected channels called control channels of the time multiplex lines, e.g., 13 through 16, between the time-slot interchange units and the time multiplex switching unit 10. Time-multiplex switch 10 connects the information in the control channels to a control distribution unit 31 which interprets a destination defining portion of the message. When the destination portion defines the central control 30 as the destination for the associated message, that message is transmitted to central control 30 via a conductor 32. When the destination portion defines a control unit, e.g., 18, the control distribution unit 31 cooperates with the time-multiplex switch 10 to transmit the message to the destination control unit in the control channels associated with the defined destination. In addition to the above, central control 30 can transmit control messages to the control units, e.g., 17, 18, by transmitting to control distribution unit 31, a control message which has an address portion defining the destination control unit.

The present embodiment also includes arrangements for sending control information from central control 30 to the control units 17 and 18 at data rates higher than the rate available using the control channels. When large amounts of data are to be transmitted, the data is sent to a block transfer unit 210, which cooperates with the control distribution unit 31 and time-multiplex switch 10 to "steal" up to 32 normally speech-conveying channels on time-multiplex lines 13 through 16 between time-multiplex switch 10 and the destination time-slot interchange unit, e.g., 11. The data in these "stolen" channels is gated by the time-slot interchange unit 11 to control unit 17 via a communication path 303. Methods and arrangements for providing digital time division switching and for the distribution of control information are well known in the art and can be found, for example, in U.S. Pat. No. 4,520,477.

Figure 2:
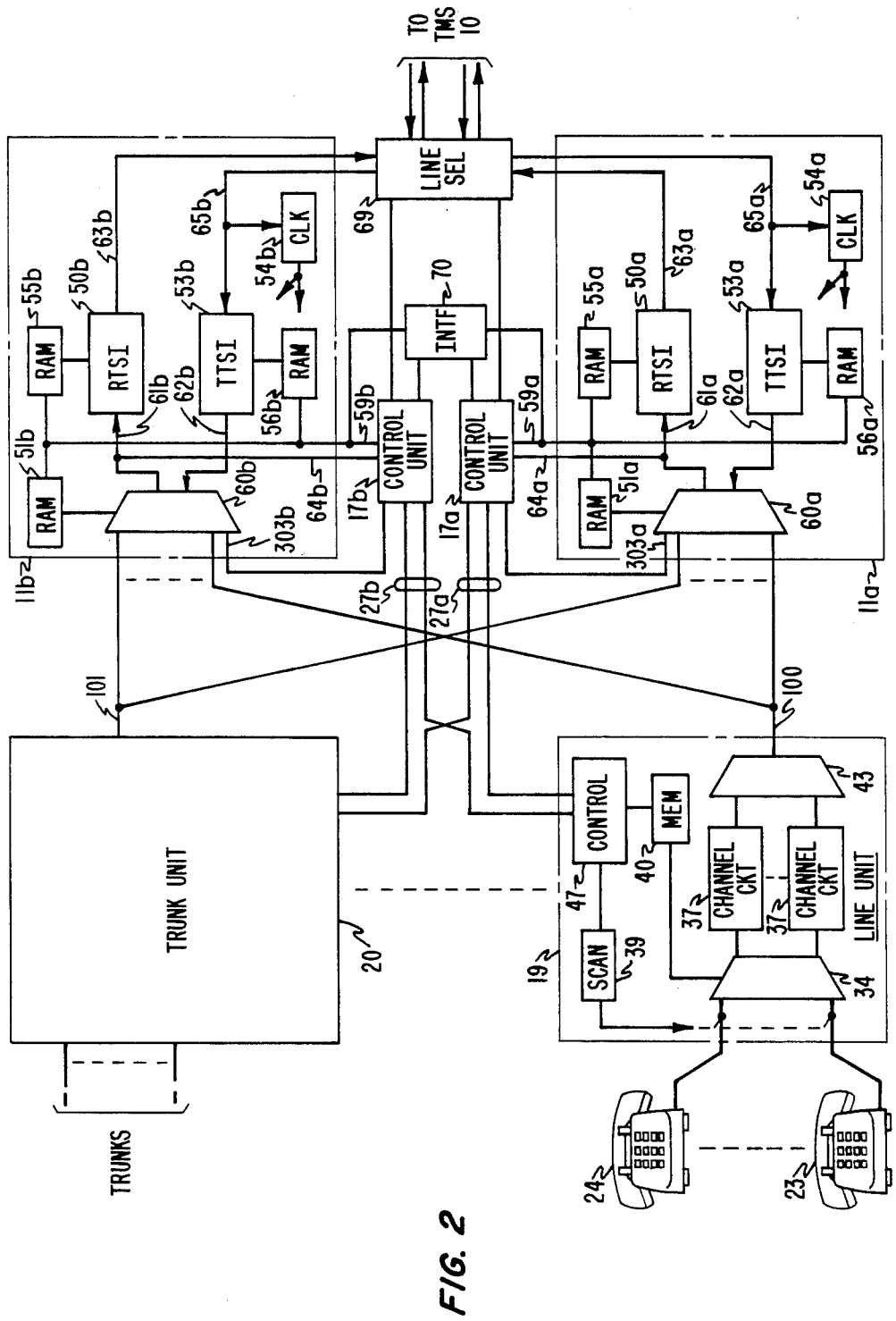
FIG. 2 is a diagram showing certain portions of FIG. 1 in greater detail.

The relationship of subscriber sets, line units and time-slot interchange units is substantially the same for each of such groups of interconnected units. Accordingly, while the description which follows relates directly to line unit 19, trunk unit 20, and time-slot interchange unit 11, it shows the relationships for all other groups of such units. FIG. 2 is a block diagram of the duplicated units provided in time-slot interchange 11 and its associated line and trunk units 19 and 20. In FIG. 2, time-slot interchange unit 11 is shown as comprising two units, 11a and 11b, and similarly, control unit 17 is shown as units 17a and 17b. The internal components of time-slot interchange unit 11a all have a suffix a, while the equivalent components in time-slot interchange unit 11b have the same component number with a suffix b. In the present embodiment, control unit 17a is permanently associated with time-slot interchange unit 11a and control unit 17b is permanently associated with time-slot interchange unit 11b. In normal operation, one of the time-slot interchange unit/control-unit pairs is in an active mode controlling call processing, while the other is in a standby mode and not controlling call processing. In the present example, control unit 17a and time-slot interchange unit 11a initially comprise the active portion of the embodiment.

Line unit 19 is connected to both time-slot interchange units 11a and 11b by bidirectional time-multiplex line 100, which conveys PCM-encoded speech representations called data words at the rate of 64 data words (channels) per 125 microsecond frame. Line unit 19 includes 64 channel circuits 37, which perform bidirectional analog-to-digital conversion and a multiplex/demultiplex arrangement 43 which receives data words from the channel circuits 37 and multiplexes them onto time-multiplex line 100. Multiplex/demultiplex arrangement 43 also receives digital signals from time-multiplex line 100 and distributes those signals to the channel circuits 37. Each channel circuit 37 is permanently assigned to one of the channels on time-multiplex line 100. Accordingly if a channel on time-multiplex multiplex line 100 is known, the particular channel circuit serving that channel is also known. Channel circuits 37 receive analog subscriber signals from and transmit analog subscriber signals to a concentrator/deconcentrator 34, which is also connected to subscriber sets 23 and 24.

Line unit 19 scans the lines connected to each subscriber set to detect requests for service. Scanning is performed by a line unit controller 47 operating in conjunction with a scanning unit 39. When a request for service is detected, line unit control 47 transmits to the control unit 17a, a message indicating the request and the identity of the requesting subscriber set. This message is transmitted to control unit 17a via a communication path 27a. Control unit 17a maintains a data base which represents the present state of the time-slot interchange unit 11a and the equipment connected thereto. This data base comprises a number of relations which are constructed in a format to be interpreted by the program currently controlling control unit 17a. This data base is dynamic and includes representations of the usage of channel circuits 37 and the occupancy of channels on the time-multiplexed lines of the system. Control unit 17a responds to each service request message by initiating a call control process for the call, which utilizes and updates the data base in completing the call. The call control process in control unit 17a performs the necessary translation based on the service requested, the identity of the requesting subscriber set and the available equipment. Upon completion of the translation function, control unit 17a transmits a message to line unit control 47 via communication path 27a defining which of the plurality of time separated channels on time multiplex line 100 is to be used to transmit information to and from the subscriber set, e.g., 23 and time-slot interchange unit 11. It should be mentioned that the same channel of time multiplexed line 100 is used for both directions of transmission for a given subscriber. Since each channel circuit 37 is permanently assigned to a given time-separated channel on time-multiplex line 100, the message from control unit 17a also defines which channel circuit is to be used for the call. Accordingly, line unit controller 47 responds to the message from control unit 17a by computing a path through concentrator/deconcentrator 34. The result of this computation is stored in a memory 40 from where it is used to maintain the connection between the selected channel circuit and the subscriber set, e.g., 23. The contents of memory 40 form a portion of what is called hardware controlling data. Hardware controlling data is data which is used relatively directly to control the associated hardware.

Time-slot interchange unit 11a includes a multiplex/demultiplex circuit 60a, which is used to connect data words in the channels on peripheral time-multiplex lines, e.g., 100 and 101 and internal time-multiplex lines 61a and 62a. Time-multiplex lines 61a and 62a convey data words at the rate of 512 data words (channels) per 125-microsecond frame. Time multiplex lines 61a and 62a comprise a bidirectional time multiplex line wherein each channel on time multiplex line 61a has an associated channel on time multiplex line 62a. Only associated channels are used for stable calls. The information defining which peripheral channels are to be connected to which internal channels is stored in a control Random Access Memory (RAM) 51a. The information stored in RAM 51a is also referred to as hardware controlling data. Control RAM 51a has a number of storage locations equal to the number of channels on each of the time-multiplex lines 61a and 62a. When control unit 17a locates a channel on time-multiplex line 100 or 101 for communication, it also assigns a channel on time-multiplex line 61a and 62a for the communication. Control unit 17a via bus 59a writes the information defining the connection into the location of control RAM 51a, which is uniquely associated with the channel selected on time-multiplex lines 61a and 62a. Time-slot interchange unit 11a includes a clock signal generator 54a, which generates signals defining 512 time-slots per 125-microsecond frame in synchronism with the 512 channels in the time-slot interchange unit. Control RAM 51a is read once each time slot at a location unique to that time slot to define the connection between data words on the peripheral time-multiplex lines, e.g., 100 and 101, and the internal channels on time-multiplex lines 61a and 62a. When a channel is established from a subscriber set or a trunk to time-multiplex line 61a, a call control process in control unit 17a surveys the information in that channel using a communication path 64a to receive signaling information such as dialed digits. After all dialed digits are received, control unit 17a transmits a control message using the above-described control channels to central control 30, which returns a control message defining a channel to the time-multiplex switch 10 on time-multiplex line 63a and a channel from time-multiplex switch 10 on time-multiplex line 65a. Each channel on time multiplex line 63a has an associated channel on time-multiplex line 65a and only associated channels are used for a stable call.

The data words transmitted in the channels on time-multiplex line 61a are sequentially written into a receive time-slot interchanger 50a, which has one storage location uniquely associated with each channel on time multiplex line 61a. A data word from a storage location of receive time-slot interchanger 50a is read each time slot used as a channel of information on time-multiplex line 63a. The address at which receive time-slot interchanger 50a is read is stored in a control RAM 55a, which is accessed once per time slot in a manner similar to control RAM 51a. That is, control RAM 55a comprises 512 storage locations, one of which is uniquely associated with each channel on time multiplex line 63a. When control unit 17a is informed by central control 30 of the particular channel on time-multiplex line 63a to use for a communication, it writes an address into control RAM 55a at the location associated with the particular channel. This write operation is performed using the communication path 59a. The address so written defines the storage location in receive time-slot interchanger 50a which stores the data words for the communication. Similarly, the information received on time-multiplex line 65a from time-multiplex switch 10 is sequentially written into a transmit time-slot interchanger 53a. The particular locations in transmit time-slot interchanger 53a, which are read to provide data words for the channels on time-multiplexed line 62a, are defined by the contents of a control RAM 56a. The cooperation of transmit time-slot interchanger 53a control RAM 56a, and control unit 17a, to properly transmit data words on time-multiplexed line 62a, is substantially identical to the cooperation of receive time-slot interchanger 50a, control RAM 55a, and control unit 17a. Accordingly, this cooperation is not discussed in detail herein.

The present embodiment further includes a line select arrangement, which operates under the control of the active control unit 17a to connect time-multiplex lines 63a and 65a to the time-multiplex switch 10 after separating the data words into two streams of 256 data words per 125 microsecond frame. In order to rapidly switch the active and standby statuses of the time-slot interchange unit/control unit pairs, it is necessary to store the same hardware controlling data in control RAMs 51b, 55b, and 56b, that is stored in 51a, 55a, and 56a, respectively. To this end, the present embodiment includes an interface circuit 70, which is controlled by the active control unit. Whenever information is written into one of the control RAMs of the active time-slot interchange unit, the interface circuit is enabled to write the same information into the same control RAM of the standby unit. When this is done, the standby unit is always up to date and rapid conversion of active and standby status is possible.

Figure 3:
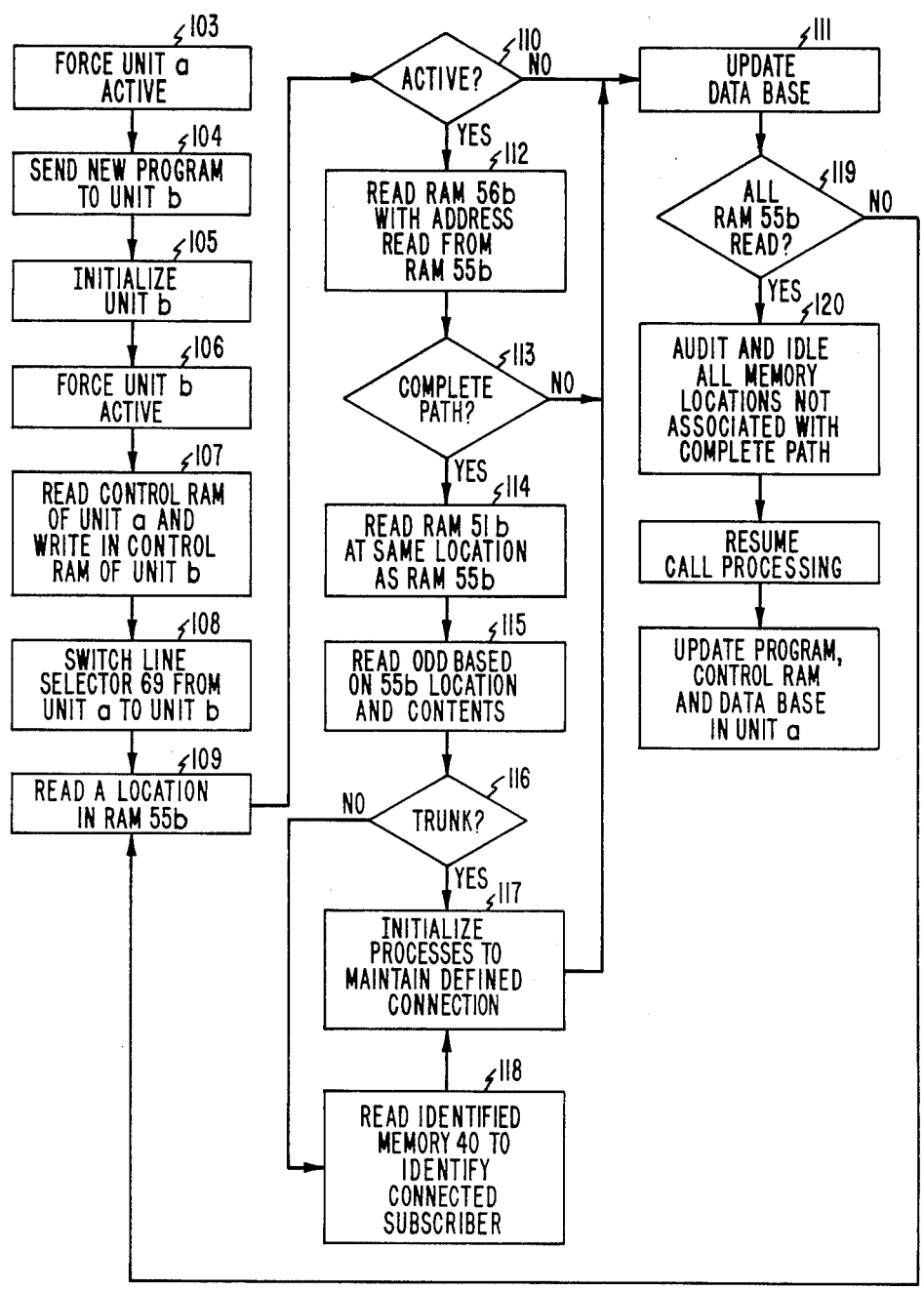
FIG. 3 is a flow chart of a method embodying the present invention.

The following, when read in conjunction with FIG. 3, describes an embodiment of the present invention used during program update. In the course of the following discussion, control unit 17a and time-slot interchange unit 11a are referred to as unit-a and control unit 17b and time-slot interchange unit 11b are referred to as unit-b. When a program update is to occur, central control 30 transmits a program update control message to control unit 17, which message defines that unit-a is to be active and unit-b is to be standby (action block 103), and that interface arrangement 70 be controlled such that no further updates are made to the control RAMs in time-slot interchange unit 11b. After control unit 17 responds to the program update control message, the new program is transmitted from central control 30 to unit-b utilizing the previously-described block transfer function (action block 104). Upon reception of the complete new program, control unit 17b initiates a process to initialize unit-b (action block 105). Such initialization includes idling all control RAM locations and constructing a data base relation, which represents all time slots as being idle. Once the initialization is completed, unit-b is made active and unit-a is made standby. Program update is of the highest priority. Accordingly, no further call processing takes place until the program update procedure is completed. It should be noted that the status of the line select unit 69 is not changed so that it continues to select data words from unit-a for transmission to time-multiplexed switch 10. Next, active control unit 17b controls the interface arrangement 70 to provide access by control unit 17b to bus 59a. Control unit 17b reads (action block 107) the contents of control RAMs 51a, 55a, and 56a and writes the information so read into the same locations of control RAMs 51b, 55b, and 56b, respectively. Unit b can successfully continue completed connections after the control RAMs have been copied. Accordingly, a signal is transmitted from control unit 17b to line select arrangement 69 defining that the data words from unit-b are to be transmitted to time-multiplexed switch 10. Line select arrangement 69 responds to this signal by transmitting unit-b's data words to time-multiplexed switch 10 to the exclusion of unit-a's data words (action block 108).

At this point in the program update process, control unit 17b begins to populate a data base and initiate processes so that it can complete all functions of call processing without disconnecting stable calls. All stable connections in the time-slot interchange unit have bidirectional paths from time-multiplexed switch 10 to the line unit 19 or trunk unit 20. If a path in only one direction exists, it is not associated with a stable call and the program update procedure removes the single path. The procedure first reads (action block 109) a predefined location in control RAM 55b. In the present embodiment, the first storage location in control RAM 55b is the predefined location. If the information so read indicates that the time-multiplexed line 61b channel associated with that location is idle (action block 110), the process updates the data base by making the associated channel on time-multiplexed lines 61b and 62b idle (action block 111). After the data base update, the process returns to read the next location of control RAM 55b in sequence. Alternatively when the contents of the location in control RAM 55b associated with a given channel x on time-multiplexed line 61b indicate that the channel x is being connected to a channel y on time-multiplexed line 63b, further tests must be performed to determine if a stable call exists.

When a channel x on time-multiplexed line 61b is being connected by receive time-slot interchanger 50b to a channel y on time-multiplexed line 63b then channel y on time-multiplexed line 65b must be being connected to channel x on time multiplexed line 62b for a stable call to exist. To determine if such a stable call exists, RAM 56b is read (action block 112) at the channel y address provided in the information read from control RAM 55b. The information read from control RAM 56b must indicate that the channel y on time-multiplexed line 65b is being connected to channel x on time-multiplexed line 62b. When the control RAM 56b location indicates the channel is idle, or if the information read does not define the same time-multiplexed line 62b channel x, the data base is updated by making channel x on time-multiplexed lines 61b and 62b idle. Again, a new location is then read from control RAM 55b. Alternatively, when the control RAM 56b location is active and points to the same channel x as is associated with the location read from control RAM 55b, further tests must be performed to locate the line or trunk using that channel. Such tests begin by reading (action block 114) control RAM 51b at the location associated with the active channel x on time-multiplexed lines 61b and 62b. As previously stated, this location contains information defining which time-multiplexed line, e.g., 100, 101, is receiving/providing data words during channel x. The new program in control unit 17b contains a data representation (called office dependent data) of the equipage of the switching system. The content of the control RAM 51b location read in action block 114 is used to access (action block 115) the office dependent data to determine the particular line unit or trunk unit connected to the identified time-multiplexed line, e.g., 100. When the identified time-multiplexed line is connected to a trunk unit, the office dependent data indicates which trunk is using the identified channel on that identified time-multiplexed line. In the case of a connected trunk, the program update process has identified the trunk, the channel on time-multiplexed line 101, and the channels on time-multiplexed lines 61b, 62b, 63b, and 65b used for a stable call. This is enough information to maintain the identified stable call and to perform call processing when necessary. Accordingly, a trunk control process is initiated (action block 117) and the dynamic data base is updated (action block 111) with the information discovered in the above-described search.

When the particular time-multiplexed line identified as part of the stable call is connected to a line unit, the office dependent data query returns the particular channel circuit using the identified channel on that time multiplexed line, e.g., 100. The program update process uses this information to read (action block 118) memory 40 via line unit controller 47 to determine which subscriber set is connected to the identified channel circuit. When this is ascertained, the program update process has discovered the subscriber set, the channel circuit, the channel on time-multiplexed line 100, and the channels on time-multiplexed lines 61b, 62b, 63b, and 65b associated with the stable call. This information is sufficient to maintain the identified stable call and to perform call processing when necessary. Accordingly, a line control process is initiated for the call and the data base is updated with the information obtained in the above-described search. The program update process continues reading locations in control RAM 55b and tracing stable calls until all 512 storage locations of control RAM 55b have been read and a trace attempted for each location read. When the last call has been traced, the dynamic data base in control unit 17b contains all the information required to perform call processing for all stable calls. Accordingly, the program update process uses this data to perform (action block 120) audits for all connections through time-slot interchange unit 11b and the connected line and trunk units to achieve a consistent view of the data. This step includes the idling of all partially-completed paths defined in control RAMs 55b and 56b and in memory 40. After the completion of the audits, normal call processing is resumed. After normal call processing resumes, control unit 17b controls interface arrangement 70 so that control unit 17b gains access to bus 59a. Control unit 17b then transmits the new program and the newly-generated data base to control unit 17a via the interface 70. Additionally, control unit 17b reads the contents of RAMs 51b, 55b, and 56b and places this information into the same locations of control RAMs 51a, 55a, and 56a.

It is to be understood that the above-described embodiment is merely illustrative of the principles of the invention and that other embodiments may be devised by those skilled in the art without departing from the spirit and scope of the invention. For example, the order of search of hardware controlling data could be altered. That is, all locations in control RAM 55b could be read to find all possible stable calls. This information could then be used to search possible connections through control RAM 56b and so on. This alternative arrangement does not trace each possible call in sequence, but performs call trace in parallel by searching each grouping of hardware controlling data, e.g., control RAM 55b.

What is claimed is:

1. In an arrangement comprising a switching network, a first controller for establishing and maintaining connections through said switching network and a second controller, a method comprising the following steps:
    inhibiting said first controller from establishing and maintaining connections through said switching network;
    reading hardware controlling data from said switching network;
    generating from said hardware controlling data a data structure in a format acceptable to said second controller,
    storing said data structure in said second controller; and
    establishing and maintaining connections through said switching network by said second controller operating in accordance with the data structure stored in said storing step.

2. The method in accordance with claim 1 wherein said generating step comprises the following steps:
    locating from said hardware controlling data, stable connections through said switching network; and
    generating said data structure by generating data statements defining each stable connection in a format acceptable to said second controller.

3. In an arrangement comprising a first and a second switching network, each switching network being associated with a first and a second controller, respectively, said switching networks comprising arrangements for selectively connecting a plurality of input ports to a plurality of output ports, a method comprising
    establishing and maintaining connections between said input and said output ports through said first switching network operating under the control of said first controller;
    inhibiting the establishment of connections between said input and said output ports through said first switching network;
    reading hardware controlling data from said first switching network by said second controller
    generating from said hardware controlling data a data structure in a format acceptable to said second controller;
    storing said data structure in said second controller; and
    establishing and maintaining connections between said input and said output ports through said second switching network by said second controller operating in accordance with the data structure stored in said storing step.

4. The method in accordance with claim 3 wherein said generating step comprises the following steps:
    locating from said hardware controlling data stable connections through said switching network and generating said data structure by generating data statements defining each stable connection in a format acceptable to said second controller.

5. In a time division switching system comprising a first time-slot interchange unit for receiving data words in a plurality of first channels and transmitting data words in selected ones of a plurality of second channels in accordance with control information stored in a first control memory; a second time-slot interchange unit for receiving data words in a plurality of third channels and transmitting data words so received in selected ones of a plurality of fourth channels in accordance with control information stored in a second control memory wherein each first channel is associated with one of said fourth channels and each second channel is associated with one of said third channels; a first controller for establishing and maintaining connections through said first and said second time-slot interchange units by modifying the contents of said first and said second control memories; and a second controller, a method comprising the following steps:
    inhibiting said first controller from modifying the contents of said first and said second control memories;
    reading the control information stored in said first and said second control memories by said second controller;
    generating from said control information a data structure in a format acceptable to said second controller;
    storing said data structure in said second controller; and
    establishing and maintaining connections through said first and said second time-slot interchange unit by said second controller operating in accordance with the data structure stored in said storing step.

6. The method in accordance with claim 5 wherein said generating step comprises the following steps:

locating from said control information, read in said reading step, stable connections through said first and said second time-slot interchange unit; and generating said data structure by generating data statements defining each stable connection in format acceptable to the second controller.

7. The method in accordance with claim 5 wherein said generating step comprises the following steps:

identifying which of said second channels is receiving data words from a given first channel;

identifying which one of said fourth channels is receiving data words from the one of said third channels associated with the channel identified in the immediately preceding step; and storing information in said data base identifying a stable call when the channel identified in the second identification step is associated with said given one of said first channels.

8. In a time divison switching system comprising a plurality of subscriber sets for transmitting and receiving subscriber signals; a first and second time multiplex line each having a plurality of time-separated channels; a connection arrangement operative under the control of control information stored in a first control memory arrangement, for transmitting subscriber signal representations from selected ones of said subscriber sets to selected ones of said first time-multiplexed line channels and for transmitting subscriber signal representations from selected ones of said second time-multiplexed line channels to selected ones of said subscriber sets; a receive time-slot interchange unit connected to said first time-multiplexed line for transmitting signal representations in the channels of said first multiplex line to channels of a third time-multiplexed line as defined by control information stored in a second control memory arrangement; a transmit time-slot interchange unit connected to said second time-multiplexed line for transmitting signal representations received on a fourth time-multiplexed line to selected channels of said second time-multiplexed line as defined by control information stored in a third control memory arrangement, wherein each channel on said first time-multiplexed line is associated with a channel on said second time-multiplexed line and each channel on said third time-multiplexed line is associated with a channel on said fourth time-multiplexed line; a first controller for establishing and maintaining connections through said connection arrangement, said receive time-slot interchange unit and said transmit time-slot interchange unit by modifying the content of said first, said second, and said third control memory arrangement; and a second controller, the method comprising the following steps:

inhibiting said first controller from modifying the contents of said first, said second, and said third control memory arrangements;

reading the control information stored in said first, said second, and said third control memory arrangements by said second controller;

generating from said control information a data structure in a format acceptable to said second controller;

storing said data structure in said second controller; and establishing and maintaining connections through said receive time-slot interchange, said transmit time-slot interchange, and said connection arrangement by said second controller operating in accordance with the data structure stored in said storing step.

9. The method in accordance with claim 8 wherein said generating step comprises the following steps:

identifying from control information from said second control memory arrangement which one of the channels of said third time-multiplexed line is receiving data words from a given channel on said first time-multiplexed line;

identifying from control information from said third control memory arrangement which one of the channels of said second time-multiplexed line is receiving data words from the one of said channels of said fourth time-multiplexed line associated with the channel identified in the immediately preceding step;

identifying from control information from said first control memory arrangement the particular one of said subscriber sets transmitting subscriber signals representations of which are being transmitted in said given one of said channels of said first time-multiplexed line by said connection arrangement, when the channel identified in the second identification step is associated with said given one of said channels on said first time-multiplexed line; and storing information in said data base identifying a stable call when the channel identified in the second identification step is associated with said given one of said channels on said first time-multiplexed line.

* * * * *